Figure 2:
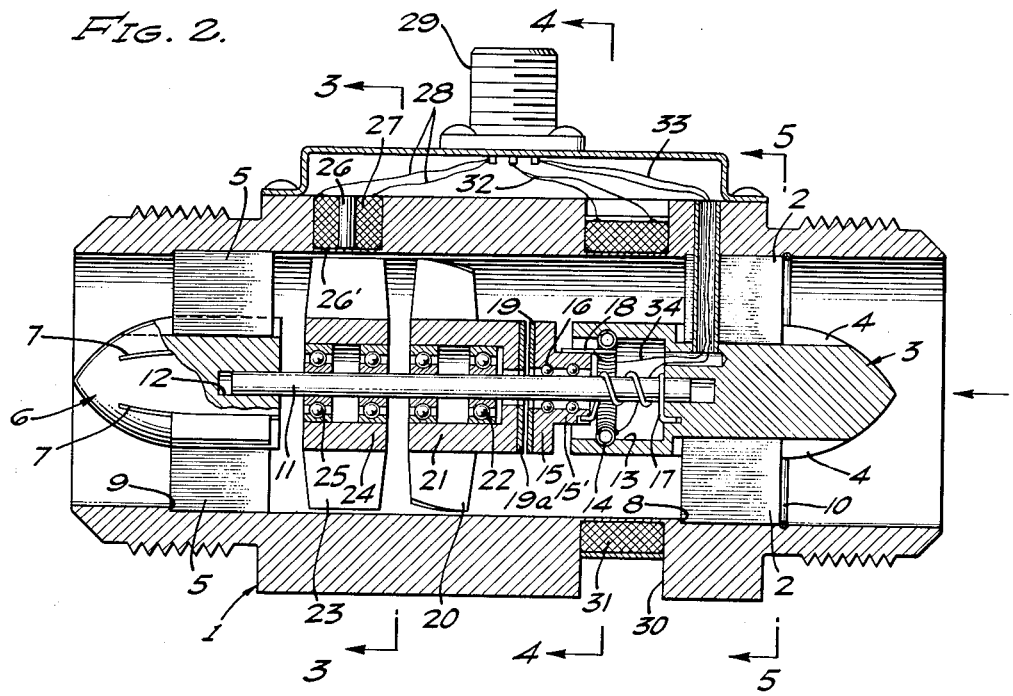

July 10, 1962  C. C. WAUGH  3,043,138
MASS FLOW METER

Filed May 26, 1958  2 Sheets-Sheet 1

INVENTOR.
CHARLES C. WAUGH
BY
ATTORNEY

July 10, 1962  C. C. WAUGH  3,043,138
MASS FLOW METER
Filed May 26, 1958  2 Sheets-Sheet 2
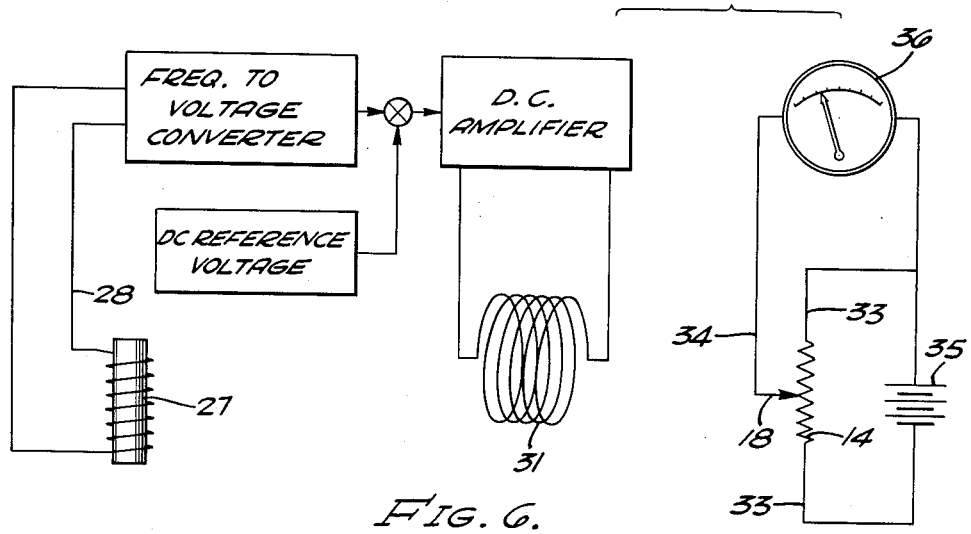
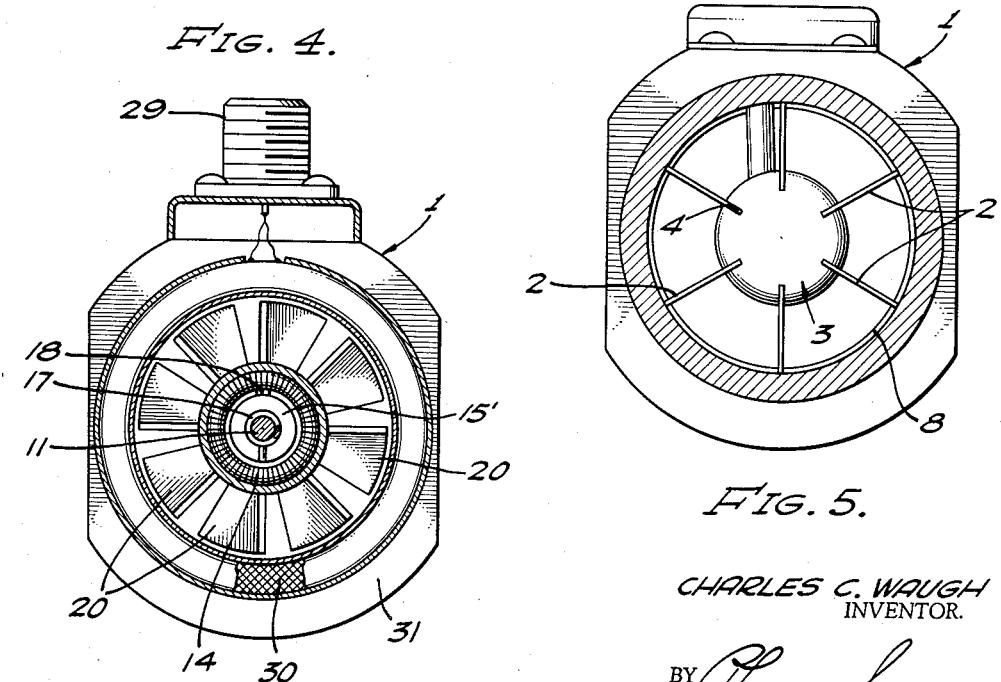
CHARLES C. WAUGH
INVENTOR.
BY
ATTORNEY United States Patent Office 3,043,138
Patented July 10, 1962

3,043,138
MASS FLOW METER
Charles C. Waugh, Tarzana, Calif., assignor to The Foxboro Company, a corporation of Massachusetts
Filed May 26, 1958, Ser. No. 737,816
8 Claims. (Cl. 73—194)

This invention relates to a mass flow meter which reports the mass rate of flow of fluids, either liquid or gas, or a combination.

Mass flow meters are known in which a fluid traveling in a conduit is given an angular velocity and a torque meter is provided which is responsive to the fluid angular velocity in terms of a torque produced by the fluid. If "$t$" is the torque, "$w$" is the angular velocity, "$r$" is the density of the fluid, "$V$" is the lineal axial fluid volume velocity and "$m$" is the linear mass velocity, then the torque "$t$" is proportional to the product "$rVw$," and since "$m$" is equal to $rV$, the mass velocity is proportional to the fraction $t/w$. Thus, if the angular velocity is maintained constant, the torque generated is proportional to the linear mass flow. Means are usually provided to measure this torque.

This invention relates to improvements in such mass flow meters whereby novel means is provided to obtain an angular fluid velocity, and novel means is provided to control the angular velocity to be constant over the desired range of flow rates for the meter. I obtain this effect by converting a part of the kinetic energy of linear or axial flow into rotational kinetic energy of the fluid, and provide means whereby the angular velocity of rotation of the fluid is maintained constant over the range of variation of flow rates of interest.

This result is accomplished by employing an impeller which converts a portion of the axial flow energy into rotational flow energy. Means are also provided to maintain the angular velocity substantially constant irrespective of the linear mass flow rate of the fluid. I measure the angular velocity of the rotating fluid and in a preferred embodiment, means are provided in the form of a servo loop to correct any deviation from the chosen angular velocity to maintain the angular velocity constant.

In a preferred embodiment, I obtain the constant angular velocity of the fluid by employing a turbine wheel which is rotated by the axial flow of the fluid. I brake the rotation of the turbine wheel so that it imparts a reaction torque on the fluid particles causing them to obtain a constant angular speed irrespective of the rate of axial flow. This is accomplished, according to a preferred embodiment, by applying a braking torque to the turbine wheel, which braking torque increases or decreases to maintain the rate of rotation of another fluid angular velocity measuring turbine wheel constant, and by providing measuring means responsive to the braking torque and thus responsive to the torque generated at this constant angular velocity as a measure of the rate of mass flow.

Figure 1:
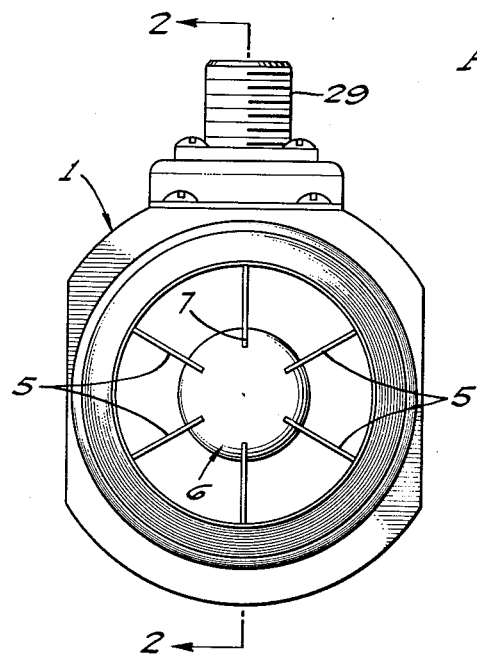
Figure 3:
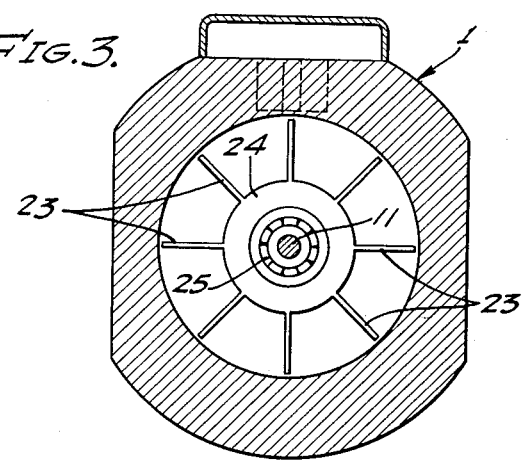

These and other objects of my invention will be understood more fully by reference to the drawings, in which:
FIG. 1 is an end view of the mass flow meter;
FIG. 2 is a section taken on line 2—2 of FIG. 1;
FIG. 3 is a section taken on line 3—3 of FIG. 2;
FIG. 4 is a section taken on line 4—4 of FIG. 2;
FIG. 5 is a section taken on line 5—5 of FIG. 2;
FIG. 6 is a wiring diagram of the circuit employed with the mass flow meter.

The mass flow meter consists of a tubular case 1 suitably provided with screw threads or other suitable means for connecting the case with conduits, mounted at each end of the tubular case. The case 1 thus provides a flow channel with an input port at one end and an output port at the other end. The flat radial blades 2 are mounted in the hub 3 which is streamlined towards the upstream side of the flow meter, the fluid entering as shown by the arrow at the right of FIG. 2. The radial blades 2 are positioned in slot 4 in the hub. At the other end of the flow meter are positioned like flat radial blades 5 mounted in the hub 6 by means of slots 7. The blades 2 abut an internal shoulder 8 and are held in position by a snap ring 10. The flat blades 5 are held frictionally in position against an internal shoulder 9. The blades 2 and 5 are stationary. Mounted in bore 12 in hub 6 and in a bore in hub 3 is a stationary axle 11 on which are mounted the bearings 25 fixedly positioned on the shaft 11, on which the hub 24 carrying the flat blades 23 is rotatably mounted. The flat blades 23 are radially positioned and are positioned at equally spaced intervals circumferentially of the hub 24. For purposes of description I will refer to this assembly as the radial blade rotor. It will be understood that other forms of blades may be used to be rotated by the angularly moving fluid to function in a manner similar to the flat blades 23 and these are included in the term radial rotor. Adjacent the bearing 25 is a bearing 22 fixedly mounted on the shaft 11 on which the hub 21 carrying the helical blades 20 is rotatably mounted. The helical blades are positioned at equally spaced intervals about the hub 21. While I prefer to use helical blades, any other geometric configuration which will cause the blades to rotate as is described for the helical blades 20 may be employed. For purposes of distinguishing the rotor, I will refer to the rotor carrying the blades 20 as the helical blade rotor, understanding this term to include equivalent form of blades. I prefer, however, to employ a blade of helical form for the helical blade rotor and a flat blade for the radial blade rotor. The hub 21 carries a friction disk 19a at one end thereof. A friction disk 19 is mounted on the brake friction disk 15 carried on a hub 15' which is mounted on roller bearings 16 in contact with shaft 11. The hub 15' and the plate 15 are thus slidably and rotationally mounted on the shaft 11. The hub 15' fits into a counter bore 13 in the hub 3. The hub 15' and plate 15 are made of magnetic material such as is used in electromagnetic and solenoid slugs. A toroidally wound resistance coil 14 is mounted on the interior face of the counter bore 13. A finger 18 is mounted on the disk 15' and insulated therefrom and is in electrical contact with the toroid resistance coil 14 which is otherwise insulated from the unit.

A helically wound biasing spring 17 is loosely positioned on the shaft 11 and connected to the hub 15' and the hub 3 so that any angular displacement of the disk 15 about the shaft 11 will impart a torsional tension in the spring 17 to act as a restoring force. Additionally, the spring is in compression and normally holds the disks 19 and 19a in pressure contact. The outer diameter of the hubs 3, 6, 21 and 24, and of the plate 15 are all substantially alike so as not to interfere with the axial flow of the fluid.

In the wall of 1 adjacent hub 24 is a recess provided for a permanent magnet slug 26 around which is positioned a coil 27 conductively coupled with said permanent magnet. The axis of the core is positioned centrally of the blades 23. The housing 1 is of non-magnetic material and thus the base 26' of the recess is made thin, as shown. Mounted in a recess 30 of wall 1, adjacent the counterbore 13 in hub 3, is a coil 31.

The core 27 which surrounds the permanent magnet 26 is connected by electrically conducting leads 28 to the connector 29, and the coil 31 is electrically connected by leads 32 to the connector 29, and the wiper 18 is electrically connected by lead 34 and the coil 14 is electrically connected by leads 33 to the connector 29. Resistance 14 and contact 18 thus form an adjustable potentiometer and by means of the D.C. voltage source or battery 35 (see FIG. 6), the angular displacement of the wiper 18 from the rest position when no flow occurs can be measured by the voltmeter 36.

The coil 27 which is conductively coupled with the magnet 26 is electrically connected by leads 28 through a frequency-to-voltage converter to a D.C. amplifier and thence to the coil 31. The coil 31 and the hub 15' thus form a solenoid of which the armature is the hub 15'. The intensity of the magnetic field generated by 31 determines the pressure which plate 19 exerts against the friction plate 19a. The magnetic field acting on the hub 15' which is of magnetic material and is magnetically coupled with the coil 31, tends to draw the hub 15' away from the plate 19a against the compression of the spring 17 which tends to hold the plate 19 against the plate 19a.

Circuitry is provided such that as the rate of rotation of the blades 23 increases or decreases, a corresponding increase or decrease of the current passing through coil 31 occurs. The magnetic field generated by 31 varies accordingly, thus exerting a force to oppose the spring tension in the spring 17 and thus to increase or decrease the pressure of the plate 19 against the plate 19a more or less firmly and to increase or decrease the braking effect on 21 as the frequency or rate of rotation of the blades 23 increases or decreases from a chosen frequency of rotation.

Various frequency-to-voltage converters may be employed. For example, I may employ a discriminator and rectify the voltages through a diode rectifier so that the output voltage varies in accordance with the frequency variation of the signal input to the discriminator, and so that over a considerable range of frequencies, the output voltage varies in accordance with the frequency of the voltage pulses generated when the blades 23 pass by the slug 26, for example, see Circuit: page 523 Terman, "Radio Engineering" McGraw-Hill, third edition 1947.

The operation of this device will be understood from the foregoing description. When there is no fluid flow through tube 1, the spring 17 exerts a compressive force against 15 and the pressure exerted by plate 19 against plate 19a holds the blades 20 in position without rotation. When flow starts through 1 in a direction of the arrow, the helical blades 20 cause the axial flow of the fluid to exert a tangential pressure against the blades 20 and thus generate a torque. If the helical lead angle L, of the blades 20 is expressed in radians per foot of axial length, then the relative angular velocity of the fluid with respect to the rotor blades will be $w = LV_1$, where $V_1$ is the axial velocity of the fluid in feet per second, and it is assumed that there is substantially no fluid leak between the outer edges of the blades 20 and the body 1. If the restraining torque on the rotor due to the friction clutch plate 19a is zero, then the fluid angular velocity will be zero and the rotor angular velocity, $w_r$, will be $w_r = LV_1$. However, if the friction clutch exerts a restraining torque on the rotor, the fluid will obtain an angular velocity, $w_f$, such that the sum of the absolute values of the rotor velocity and fluid angular velocity will be $w_r + w_f = LV_1$. The restraining torque on the rotor will be proportional to $w_f r V$ where $r$ is the fluid density. Therefore, the angular fluid velocity, $w_f$, can be controlled by controlling the restraining torque on the rotor.

The fluid, therefore, exits from the blades 20 having a linear velocity and an angular velocity. As the fluid passes the radial flat blades 23 a torque is created causing the blade 23 and the hub 24 to rotate about the axis of the rod 11 with an angular velocity (revolutions per minute) depending upon the angular velocity of the fluid exiting from the turbine blades 20.

The rotor composed of the hub 24 and the blades 23 are of a magnetic material, by which I mean are of relatively high magnetic permeability and not necessarily permanently magnetized. The rest of the structure (other than the hub 15') is formed of non-magnetic material of low permeability. Each time a blade 23 passes by the permanent magnet 26 a change in flux occurs inducing a voltage in the coil 27. This voltage rises and falls at a frequency equal to the frequency at which the blades 23 pass by the core 26. Therefore, the frequency of the current generated in the coil 27 and passing via 28 is proportional to the frequency of rotation of the hub 24 and therefore to the angular velocity of the fluid passing by the blades 23.

The current passes through the frequency-to-voltage converter described above and a voltage is generated at the output of the frequency converter which in magnitude is proportional to the frequency of the current input to the frequency converter. The voltage output of the frequency converter is compared to a reference D.C. voltage chosen to match the output voltage of the frequency converter obtained at a chosen r.p.m. of the blades 20. Thus any difference between the output voltage of the frequency converter and the reference voltage results in an error signal voltage which is proportional to the deviation of the rotor angular velocity from the chosen rotor angular velocity at which the output voltage is substantially equal to the reference voltage. The output voltage is a measure of the frequency of the current and thus also the r.p.m. of the blades 23. The error signal voltage is also proportional to the deviation of the frequency of the generated current and therefore of the r.p.m. of the blades 23 from their chosen value, i.e., to the frequency error. This voltage is amplified in a direct coupled amplifier of standard and well known construction and then passes through the coil 31. The magnitude of the magnetic field thus generated axially of the coil 31 is thus proportional to the frequency deviation of the current generated by the rotation of the blades 23 from the chosen frequency.

The hub 15' and plate 15 being made of magnetic material, respond as a solenoid to the magnetic field and will be drawn away from the plate 19a with a force that is a function of the magnetic field generated in the coil 31. Thus, it draws the plate 19 away from the plate 19a. The withdrawal of plate 19 relieves the pressure against the plate 19a and permits the blades 20 to rotate more rapidly, thus reducing the angular velocity of the fluid exiting from the blades 20. This reduces the speed of rotation of the blades 23 and the frequency of the current generated in 27. The decrease in current in 31 thus reduces the force opposing the spring 17 and increases the pressure of the plate 19 against 19a slowing the rotation of 21. The servo loop thus obtained, permits, by design of the solenoid and of the spring, production of a desired balance of forces whereby the speed of the fluid passing from rotation of 21 is maintained constant by compensating for any change in the linear flow of the fluid through the tube. It is not required that the force be exactly proportional to the frequency error providing the system gain is great enough to maintain the error to a negligible value.

By this mechanism, any desired balanced pressure established by the spring 17 and the opposing magnetic spring described above can be maintained to maintain a desired angular velocity of the fluid passing from the blades 20.

It will be observed that the rotation of plate 15 is restrained by the helical spring 17 so that at any given speed of rotation of the hub 21 under the influence of the balanced pressure, the plate 15 will undergo a proportional angular deflection due to the slippage of 19a over 19 and the consequent drag on 19. Thus, at each angular velocity of the fluid, plate 15 will take an equilibrium position angularly displaced from rest position, i.e., under no flow conditions. This angularly displaced position of the pressure plate 15 is therefore a measure of the torque generated at 21 and of the mass velocity of the fluid passing through the conduit 1. It is reported by the voltage appearing in the meter 36.

While I have described a particular embodiment of my invention for the purpose of illustration, it should be understood that various modifications and adaptations thereof may be made within the spirit of the invention as set forth in the appended claims.

I claim:

1. A mass flow meter comprising a flow channel, said channel including an entrance port and an exit port, a first rotatable means in said channel to impose an angular velocity to said fluid, means to apply a braking torque to said first rotatable means to maintain said angular velocity constant, means to sense the magnitude of said torque, a second rotatable means responsive to said fluid angular velocity, means to generate an electrical signal responsive to angular velocity of said second rotatable means, means responsive to said electrical signal to control said torque applying means to maintain constant angular velocity of said fluid.

2. A transducer for a fluid mass flow meter comprising means defining a flow channel, said channel including an entrance port and an exit port, rotatable means in said channel rotated in response to the flow of fluid in said channel and reactive to the linear velocity of said fluid to impose an angular velocity to said fluid, variable braking means for applying a variable braking torque to said rotatable means, and additional means for measuring the angular velocity of said fluid passing from said first mentioned rotatable means, and means for producing an electrical signal indicative of said angular velocity, and means for controlling said braking means in response to said signal, whereby the angular velocity as measured by said measuring means may be employed to control said variable braking means for maintaining said angular velocity substantially constant.

3. A transducer as set forth in claim 2, and further including means for sensing the magnitude of said braking torque as an indication of mass flow through said channel.

4. A transducer for a fluid mass flow meter comprising means defining a flow channel, said channel including an entrance port and an exit port, a helical blade rotor in said channel rotated in response to the flow of fluid in said channel and reactive to the linear velocity of said fluid to impose an angular velocity to said fluid, variable braking means for applying a variable braking torque to said helical blade rotor, and additional means for measuring the angular velocity of said fluid passing from said helical blade rotor, said additional means comprising a radial blade motor and means for controlling said variable braking means in response to the rate of rotation of said radial blade motor, whereby the angular velocity as measured by said measuring means may be employed to control said variable braking means for maintaining said angular velocity substantially constant.

5. A transducer for a fluid mass flow meter comprising means defining a flow channel, said channel including an entrance port and an exit port, rotatable means in said channel rotated in response to the flow of fluid in said channel and reactive to the linear velocity of said fluid to impose an angular velocity to said fluid, variable braking means for applying a variable braking torque to said rotatable means, said braking means including a brake connected to said first-named rotatable means, and additional means for measuring the angular velocity of said fluid passing from said first mentioned rotatable means, said additional means comprising a second rotatable means responsive to said angular velocity to cause rotation thereof at an angular velocity determined by the angular velocity of said fluid, and further including a current generating means actuated by the second-named rotatable means to generate a current having a frequency determined by said angular velocity of said rotating means, and means responsive to the frequency of said current to vary the effectivness of said brake.

6. A transducer as set forth in claim 5, wherein the last-recited means includes a frequency-to-voltage converter electrically connected to said current generating means, and means coupling the output of said frequency-to-voltage converter to the said braking means.

7. A transducer as set forth in claim 6, wherein the last-recited means includes a reference voltage means electrically connected to the output of said frequency-to-voltage converter, and means for applying the difference of voltage as an error signal voltage to said braking means to vary the speed of rotation of the first-mentioned rotating means to diminish said error signal voltage.

8. A transducer for a fluid mass flow meter comprising means defining a flow channel, said channel including an entrance port and an exist port, rotatable means in said channel rotated in response to the flow of fluid in said channel and reactive to the linear velocity of said fluid to impose an angular velocity to said fluid, variable braking means for applying a variable braking torque to said rotatable means, and additional means for measuring the angular velocity of said fluid passing from said first-mentioned rotatable means, a shaft axially positioned in said channel, said additional means comprising a radial blade rotor having blades of material having relatively high magnetic permeability mounted for rotation about said shaft, said first-mentioned rotatable means comprising a non-magnetic helical blade rotor mounted for rotation about said shaft adjacent to said radial blade rotor, a permanent magnet mounted in the said channel adjacent the periphery of said radial blade rotor, and a field coil inductively coupled with said magnet, sad variable braking means comprising a friction disc connected to said helical blade rotor, a second friction disc slidably and rotatably mounted on said shaft adjacent said first friction disc, a magneitc hub connected to said second friction disc and mounted for slidable and rotational motion with said second friction disc, a solenoid coil in the wall of said channel defining means magnetically coupled with said hub to form a solenoid, and a biasing spring connected to said hub and to a fixed point on said channel defining means, and means connected to said hub responsive to the angular displacement of said hub about said shaft to sense said displacement, whereby the angular velocity as measured by said measuring means may be employed to control said variable braking means for maintaining said angular velocity substantially constant.

References Cited in the file of this patent

UNITED STATES PATENTS

| | | |
|---|---|---|
| 2,709,366 | Potter | May 31, 1955 |
| 2,812,661 | Cox | Nov. 12, 1957 |
| 2,832,218 | White | Apr. 29, 1958 |
| 2,857,761 | Bodge | Oct. 28, 1958 |
| 2,896,084 | MacDonald | July 21, 1959 |